United States Patent
Yura et al.

(10) Patent No.: US 11,329,285 B2
(45) Date of Patent: *May 10, 2022

(54) LITHIUM COMPOSITE OXIDE SINTERED BODY PLATE AND LITHIUM SECONDARY BATTERY

(71) Applicant: NGK INSULATORS, LTD., Nagoya (JP)

(72) Inventors: Yukinobu Yura, Nagoya (JP); Shigeki Okada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 263 days.

This patent is subject to a terminal disclaimer.

(21) Appl. No.: 16/537,757

(22) Filed: Aug. 12, 2019

(65) Prior Publication Data
US 2019/0363359 A1 Nov. 28, 2019

Related U.S. Application Data

(63) Continuation of application No. PCT/JP2018/003914, filed on Feb. 6, 2018.

(30) Foreign Application Priority Data

Feb. 13, 2017 (JP) .............................. JP2017-024345
May 22, 2017 (JP) .............................. JP2017-101079
(Continued)

(51) Int. Cl.
*H01M 4/00* (2006.01)
*H01M 4/525* (2010.01)
(Continued)

(52) U.S. Cl.
CPC ............ *H01M 4/525* (2013.01); *C01G 51/42* (2013.01); *C01G 51/66* (2013.01); *H01M 4/505* (2013.01);
(Continued)

(58) Field of Classification Search
CPC .. H01M 4/131; H01M 4/0404; H01M 4/0471; H01M 4/364; H01M 4/505;
(Continued)

(56) References Cited

U.S. PATENT DOCUMENTS

2012/0009470 A1* 1/2012 Sugiura ................. H01M 4/505
429/211
2012/0009471 A1 1/2012 Sugiura et al.
(Continued)

FOREIGN PATENT DOCUMENTS

JP 2012-9194 A 1/2012
JP 2013-247022 A 12/2013
(Continued)

OTHER PUBLICATIONS

International Search Report and Written Opinion (Application No. PCT/JP2018/003914) dated Apr. 10, 2018 (with English translation), 10 pages.

*Primary Examiner* — Nicholas P D'Aniello
(74) *Attorney, Agent, or Firm* — Burr & Brown, PLLC

(57) ABSTRACT

Disclosed is a lithium complex oxide sintered plate including a plurality of primary grains having a layered rock-salt structure, the primary grains being bonded. The lithium complex oxide has a composition represented by the formula: $Li_x(Co_{1-y}M_y)O_{2\pm\delta}$ (wherein, $1.0 \leq x \leq 1.1$, $0 < y \leq 0.1$, $0 \leq \delta < 1$, and M is at least one selected from the group consisting of Mg, Ni, Al, and Mn), and the primary grains have a mean tilt angle of more than 0° to 30° or less, the mean tilt angle being a mean value of the angles defined by the (003) planes of the primary grains and the plate face of the lithium complex oxide sintered plate.

8 Claims, 1 Drawing Sheet

Crystal Direction Map

(30) Foreign Application Priority Data

Aug. 23, 2017 (JP) .............................. JP2017-160592
Dec. 20, 2017 (JP) .............................. JP2017-244189

(51) Int. Cl.
| | |
|---|---|
| *C01G 51/00* | (2006.01) |
| *H01M 4/505* | (2010.01) |
| *H01M 10/0525* | (2010.01) |
| *H01M 4/02* | (2006.01) |

(52) U.S. Cl.
CPC ..... *H01M 10/0525* (2013.01); *C01P 2004/03* (2013.01); *C01P 2006/16* (2013.01); *C01P 2006/40* (2013.01); *H01M 2004/021* (2013.01); *H01M 2004/028* (2013.01)

(58) Field of Classification Search
CPC ............. H01M 4/525; H01M 10/0436; H01M 10/0525; H01M 2004/021; H01M 10/052; H01M 2004/028; C04B 35/01; C04B 38/02; C04B 2235/785; C04B 2235/786; C04B 2235/787; C04B 2111/00853; C04B 35/62218; C04B 2235/6562; C04B 2235/6567; C04B 2235/661; C04B 2235/6587; C04B 2235/77; C04B 2235/6025; C04B 2235/3203; C04B 2235/3275; Y02E 60/10

See application file for complete search history.

(56) References Cited

U.S. PATENT DOCUMENTS

2012/0256337 A1* 10/2012 Yokoyama ............. C01G 53/42
264/15
2016/0211506 A1 7/2016 Yura et al.

FOREIGN PATENT DOCUMENTS

| | | |
|---|---|---|
| JP | 5587052 B | 8/2014 |
| JP | 5703409 B | 2/2015 |
| JP | 5752303 B | 5/2015 |
| WO | 2016/052176 A1 | 4/2016 |

* cited by examiner

LITHIUM COMPOSITE OXIDE SINTERED BODY PLATE AND LITHIUM SECONDARY BATTERY

CROSS-REFERENCE TO RELATED APPLICATIONS

This application is a continuation application of PCT/JP2018/003914 filed Feb. 6, 2018, which claims priority to Japanese Patent Application No. 2017-024345 filed Feb. 13, 2017, Japanese Patent Application No. 2017-101079 filed May 22, 2017, Japanese Patent Application No. 2017-160592 filed Aug. 23, 2017, and Japanese Patent Application No. 2017-244189 filed Dec. 20, 2017, the entire contents all of which are incorporated herein by reference.

BACKGROUND OF THE INVENTION

1. Field of the Invention

The present invention relates to a lithium complex oxide sintered plate for use in a positive electrode of a lithium secondary battery, and a lithium secondary battery.

2. Description of the Related Art

Powder-dispersed positive electrodes are widely known as layers of positive electrode active material for lithium secondary batteries (also referred to as lithium ion secondary batteries), and are usually produced by kneading and molding particles of lithium complex oxide (typically, lithium-transition metal oxide) and additives, such as binders or conductive agents. Such powder-dispersed positive electrodes contain a relatively large amount (e.g., about 10% by weight) of binder that does not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency. Some attempts have been made to improve the capacity and charge/discharge efficiency by positive electrodes or layers of positive electrode active material composed of lithium complex oxide sintered plate. In this case, since the positive electrode or the layer of positive electrode active material contains no binder, high capacity and satisfactory charge/discharge efficiency can be expected due to a high filling density of lithium complex oxide.

For example, PTL 1 (JP5587052B) discloses a positive electrode including a current collector of the positive electrode and a positive electrode active material layer connected to the current collector of the positive electrode with a conductive bonding layer therebetween. The layer of positive electrode active material is composed of a lithium complex oxide sintered plate, and the sintered plate has a thickness of 30 µm or more, a porosity of 3 to 30%, and an open pore rate of 70% or more. In addition, the lithium complex oxide sintered plate has a structure in which a large number of primary grains is bonded, the grains having a grain diameter of 5 µm or less, having a layered rock-salt structure, and exhibiting a ratio [003]/[104] of the diffraction intensity on the (003) plane to the diffraction intensity on the (104) plane in X-ray diffractometry of 2 or less.

PTL 2 (JP5752303B) discloses a lithium complex oxide sintered plate used in a positive electrode of a lithium secondary battery, and the lithium complex oxide sintered plate has a thickness of 30 µm or more, a porosity of 3 to 30%, and an open pore rate of 70% or more. In addition, the lithium complex oxide sintered plate has a structure in which a large number of primary grains is bonded, the grains having a grain diameter of 2.2 µm or less, having a layered rock-salt structure, and exhibiting a ratio [003]/[104] of the diffraction intensity on the (003) plane to the diffraction intensity on the (104) plane in X-ray diffractometry of 2 or less.

PTL 3 (JP5703409B) discloses a lithium complex oxide sintered plate used in a positive electrode of a lithium secondary battery, and the lithium complex oxide sintered plate has a structure in which a large number of primary grains is bonded, the grains having a grain diameter of 5 µm or less. In addition, the lithium complex oxide sintered plate has a thickness of 30 µm or more, a mean pore diameter of 0.1 to 5 µm, and a porosity of 3% or more to less than 15%. The lithium complex oxide sintered plate also exhibits a ratio [003]/[104] of the diffraction intensity on the (003) plane to the diffraction intensity on the (104) plane in X-ray diffractometry of 2 or less.

All PTLs 1 to 3 have addressed the problem of deterioration in cycle characteristics (capacity retention characteristics when charge/discharge cycles are repeated) in a region having a significantly high filling rate of lithium complex oxide in the sintered plate. In detail, the PTLs have found that the deterioration of cycle characteristics is caused by cracking at grain boundaries in the sintered plate (hereinafter, grain boundary cracking) and separation at the interface between the sintered plate and the conductive bonding layer (hereinafter, bonding interface separation), and solved the above problem through restraining such grain boundary cracking and bonding interface separation.

CITATION LIST

Patent Literature

PTL1: JP5587052B
PTL2: JP5752303B
PTL3: JP5703409B

SUMMARY OF THE INVENTION

During evaluation of a lithium secondary battery including a conventional lithium complex oxide sintered plate (e.g., a sintered $LiCoO_2$ plate) as a positive electrode in a cycle test involving a constant voltage (CV) charge or a high-rate charge/discharge, undesirable behaviors may occur, such as a sharp drop in voltage and deterioration of cycle performance due to noisy turbulence in the waveform of the charge/discharge curve. Such behaviors are not observed in common coated positive electrodes, and specific to sintered positive electrodes.

The present inventors have now discovered the following facts: In the sintered $LiCoO_2$ plate, the (003) planes of primary grains are oriented at a mean angle of more than 0° to 30° or less to the face of the sintered $LiCoO_2$ plate, and Co is partially replaced with a specific element M selected from Mg, Ni, Al and Mn, and such modification can avoid undesirable behaviors as described above in a lithium secondary battery including the sintered $LiCoO_2$ plate as a positive electrode.

Accordingly, an object of the present invention is to provide a lithium complex oxide sintered plate that does not cause undesirable behaviors, such as a sharp drop in voltage and deterioration of cycle performance due to noisy turbulence in the waveform of the charge/discharge curve.

One embodiment of the present invention provides a lithium complex oxide sintered plate for use in a positive electrode of a lithium secondary battery. The lithium complex oxide sintered plate has a structure in which a large number of primary grains having a layered rock-salt structure are bonded, the lithium complex oxide having a composition represented by the formula: $Li_x(Co_{1-y}M_y)O_{2\pm\delta}$ (wherein, $1.0 \leq x \leq 1.1$, $0 < y \leq 0.1$, $0 \leq \delta < 1$, and M is at least one selected from the group consisting of Mg, Ni, Al, and Mn). The plurality of primary grains has a mean tilt angle of more than 0° to 30° or less, the mean tilt angle being a mean value of the angles defined by the (003) planes of the plurality of primary grains and the plate face of the lithium complex oxide sintered plate.

One embodiment of the present invention provides a lithium secondary battery including a lithium complex oxide sintered plate as a positive electrode.

DETAILED DESCRIPTION OF THE INVENTION

Definition

Figure 1:
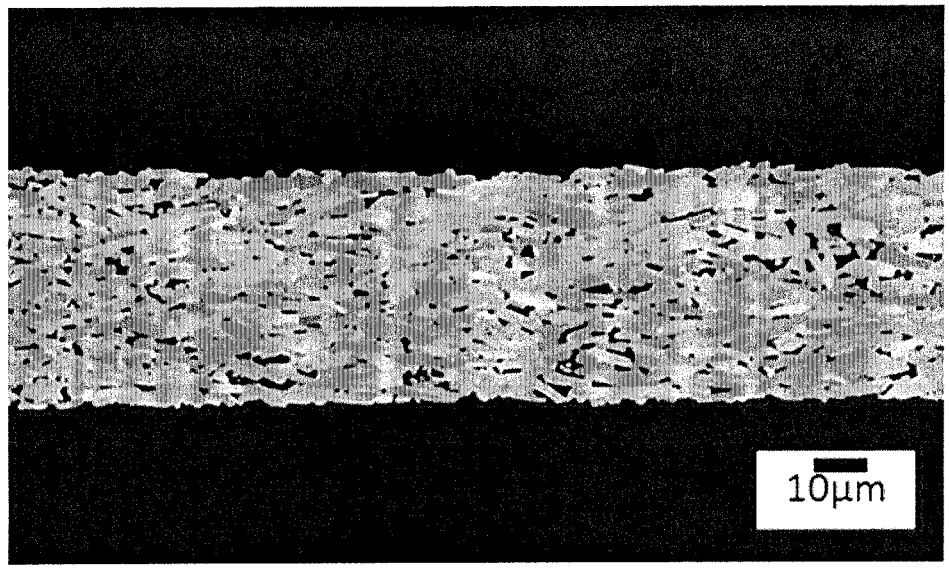
FIG. 1 is a SEM image of an example polished cross-section (a cross-section perpendicular to the plate face) of a lithium complex oxide sintered plate produced in Example B1.

The definitions of the parameters are given below for specifying the present invention.

In the present specification, the term "porosity" refers to the volume rate of pores (including open pores and closed pores) in a lithium complex oxide sintered plate. The porosity can be measured by analysis of a cross-sectional SEM image of the sintered plate. For example, the sintered plate is processed with a cross-section polisher (CP) to expose a polished cross-section. The polished cross-section is observed with a SEM (scanning electron microscope) at a predetermined magnification (for example, 1000 folds) and a predetermined field of view (for example, 125 μm×125 μm). The resulting SEM image is analyzed to divide the total area of all pores in the field of view by the whole area (cross-sectional area) of the sintered plate in the field of view, and the resultant value is multiplied by 100 to give the porosity (%).

In the present specification, the term "mean pore diameter" refers to the mean value of the diameters of pores contained in the lithium complex oxide sintered plate. The "diameter" typically corresponds to the diameter of the spheres if the pores have a spherical form that have the same volume or the same cross-sectional area. In the present invention, the "mean value" is appropriately calculated on the basis of the number. Such a mean pore diameter can be given by a widely known method, such as an image processing process of a cross-sectional SEM (scanning electron microscope) photograph and a mercury intrusion process. Preferably, the mean pore diameter may be measured by the mercury intrusion process with a mercury porosimeter.

In the present specification, the term "open pore rate" refers to the volume rate (vol %) of open pores to all the pores (including open pores and closed pores) contained in the lithium complex oxide sintered plate. The "open pores" refer to pores that are in communication with the outside of the sintered plate among all pores contained in the sintered plate. The "closed pores" refers to the pores that are not in communication with the outside of the sintered plate among all pores contained in the sintered plate. The open pore rate can be calculated from the total porosity corresponding to the sum of open and closed pores based on the bulk density, and the closed porosity corresponding to closed pores based on the apparent density. The parameters used for calculation of the open pore rate may be measured by, for example, the Archimedes method. For example, the closed porosity (vol %) can be determined from the apparent density measured by the Archimedes method, and the total porosity (vol %) can be determined from the bulk density measured by the Archimedes method. Accordingly, the open pore rate can be determined from the closed porosity and the total porosity by the following expression.

$$\begin{aligned}(\text{open pore rate}) &= (\text{open porosity}) / (\text{total porosity}) \\ &= (\text{open porosity}) / [(\text{open porosity}) + (\text{closed porosity})] \\ &= [(\text{total porosity}) - (\text{closed porosity})] / (\text{total porosity})\end{aligned}$$

In the present specification, the term "primary grain diameter" refers to the mean grain diameter of the primary grains in the lithium complex oxide sintered plate. The primary grain diameter can be measured by analysis of a cross-sectional SEM image of the sintered plate. For example, the sintered plate is processed with a cross section polisher (CP) to expose a polished cross section. The polished cross section is observed by SEM (scanning electron microscopy) at a predetermined magnification (for example, 1000 folds) and a predetermined field of view (for example, 125 μm×125 μm). In this case, the field of view is selected such that 20 or more primary grains are located in this field. In the resultant SEM image, circumscribed circles are drawn for all primary grains and the diameters of circumscribed circles are measured. From this measurement, the mean value of these diameters is defined as the primary grain diameter.

In the present specification, the term "tilt angle of primary grain" refers to an angle defined by the (003) planes of the primary grains and the face of the lithium complex oxide sintered plate. The tilt angle of the primary grain can be measured through analysis of the cross-section of the sintered plate by electron back scattering diffractometry (EBSD). For example, the sintered plate is processed with a cross-section polisher (CP) to expose a polished cross section. The polished cross section is analyzed by electron back scattering diffractometry (EBSD) at a predetermined magnification (for example, 1000 folds) and a predetermined field of view (for example, 125 μm×125 μm). In the EBSD image, the tilt angle of each primary grain is represented with a gray scale, and darker shading indicates a smaller tilt angle. Such analysis can determine the tilt angle of each primary grain. In the present specification, the term "mean tilt angle of primary grains" refers to the mean value of angles defined by the (003) planes of the primary grains and the plate face of the lithium complex oxide sintered plate, and can be determined by calculating the rate (%) of the area of the grains included in the range of 0° to 30° from the (003) plane to the area of all the grains in an EBSD image at a predetermined magnification (e.g., 1000 folds) and a predetermined field of view (e.g., 125 μm×125 μm).

Lithium complex oxide sintered plate The lithium complex oxide sintered plate according to the present invention is used in a positive electrode of a lithium secondary battery. The lithium complex oxide sintered plate has a structure in which a plurality of primary grains having a layered rock-salt structure is bonded. The lithium complex oxide has a composition represented by the formula: $Li_x(Co_{1-y}M_y)O_{2\pm\delta}$ (wherein, $1.0\leq x\leq 1.1$, $0\leq y\leq 0.1$, $0\leq\delta<1$, and M is at least one selected from the group consisting of Mg, Ni, Al and Mn). In addition, the lithium complex oxide sintered plate has a mean tilt angle of the primary grains of more than 0° to 30° or less. In this manner, the sintered $LiCoO_2$ plates are oriented at a mean tilt angle of more than 0° to 30° or less to the plate face, and Co in the $LiCoO_2$ is partially replaced with a specific element M selected from Mg, Ni, Al and Mn. Such modification can avoid the undesirable behaviors described above in a lithium secondary battery including the sintered plate as a positive electrode. In other words, the resulting lithium complex oxide sintered plate incorporated as a positive electrode into a lithium secondary battery causes no undesirable behaviors, such as a sharp drop in voltage and deterioration of cycle performance due to noisy turbulence in the waveform of the charge/discharge curve in a cycle test involving a constant voltage (CV) charge or a high-rate charge/discharge.

Although it is not clear why the above undesirable behaviors are restrained by orientation of the (003) planes in the primary grains at a predetermined angle and partial replacement of Co with a specific element M, the following mechanism is speculated. Instable charge/discharge among the undesirable behaviors is caused by use of the sintered plate as $LiCoO_2$ positive electrode (i.e. this behavior does not occur in a coated positive electrode), and this behavior constantly occurs at a specific potential. Around this potential, $LiCoO_2$ is in a coexistence state of two phases having different c-axes. One of the phases has low electron conductivity (i.e., $LiCoO_2$ is known to have low electron conductivity in a fully charged state.). In this respect, in the positive electrode made of the sintered plate, electron conduction should be secured in the passage through the inside of the sintered plate from a current collector, and a difference (variation) in electron conductivity is generated depending on the condition of the passage inside the sintered plate, thereby this irregular electron conductivity is inferred to lead to the undesirable behaviors. Although the reason is not clear in this mechanism, the partial replacement of Co in the sintered $LiCoO_2$ plate with a specific element M can prevent a decrease in the electron conductivity around the specific potential. However, in the case where the crystal orientations of the primary grains in the sintered plate are not highly aligned (i.e., randomly aligned), the sintered plate has two directions, i.e., a direction of ready electron conduction and a direction of bare electron conduction inside the sintered plate, resulting in remaining nonuniformity in electron conductivity indicating insufficient improvement. Accordingly, it is believed that the orientation of the (003) planes in the primary grains at a predetermined angle causes the electron conductivity to be uniform in the sintered plate, resulting in solving the above problem.

In particular, the (003) plane impedes the intercalation and deintercalation of lithium ions in the lithium complex oxide having a layered rock-salt structure. Accordingly, tilting of such (003) plane within 30° or less at a mean value to the plate face, namely, approaching to a parallel direction, indicates that the migration distance of lithium ions gets greatly longer from one side to the other side of the sintered plate used as the positive electrode. Nevertheless, the result that the sintered plate of the present invention provides high battery performance is entirely surprising finding beyond expectation.

The lithium complex oxide sintered plate has a structure that a plurality of (namely, a large number of) primary grains is bonded having a layered rock-salt structure. Accordingly, these primary grains are composed of a lithium complex oxide having a layered rock-salt structure. The lithium complex oxide used in the present invention has a composition represented by the formula: $Li_x(Co_{1-y}M_y)O_{2\pm\delta}$ (wherein, $1.0\leq x\leq 1.1$, $0<00.1$, $1:316<1$, and M is at least one selected from the group consisting of Mg, Ni, Al, and Mn, preferably Mg.). In other words, this composition corresponds to $LiCoO_2$ in which Co is partially replaced with another element M. In the formula x is typically 1.0; y is preferably $0.005\leq y\leq 0.1$, more preferably $0.008\leq y\leq 0.08$, further more preferably $0.01\leq y\leq 0.05$; and δ is a value determined to satisfy the condition of charge neutrality. Typical lithium complex oxides have a layered rock-salt structure. The layered rock-salt structure refers to a crystalline structure that lithium layers and transition metal layers other than lithium are alternately stacked with oxygen layers interposed therebetween. That is, the layered rock-salt structure is a crystalline structure that transition metal ion layers and single lithium layers are alternately stacked with oxide ions therebetween (typically, an α-$NaFeO_2$ structure: a cubic rock-salt structure in which transition metal and lithium are regularly disposed in the axis direction).

The mean tilt angle of the plurality of primary grains in the lithium complex oxide sintered plate (i.e., the mean value of the angles defined by the (003) planes and the plate face) is more than 0° to 30° or less, preferably 5° to 28°, more preferably 10° to 25°. In addition, the rate of individual primary grains having a tilt angle (i.e., an angle defined by the (003) planes and the plate face) of 0° to 30° among all the primary grains in the lithium complex oxide sintered plate is preferably 60% or more, more preferably 80% or more, and further more preferably 90% or more. The upper limit may be any value, for example, may be 100%. The rate of primary grains having a tilt angle of 0° to 30° is typically 95% or less, and more typically 90% or less. It is believed that the above range can more advantageously disperse the stress during charge and discharge cycles, resulting in a further improvement in rapid charge/discharge characteristics.

The lithium complex oxide sintered plate includes pores. The pores included in the sintered plate appropriately or uniformly release the stress occurring by expansion and contraction of the crystalline lattice accompanying the intercalation and deintercalation of lithium ions during the charge/discharge cycles. In this mechanism, the grain boundary cracking during repetition of charge/discharge cycles is effectively restrained. In addition, the pores (open pores) in the interface on the conductive bonding layer can increase the bonding strength. The separation at the above bonding interface is appropriately restrained, the separation resulting from the deformation of the lithium complex oxide sintered plate due to the expansion and contraction of the crystalline lattice accompanying the intercalation and deintercalation of lithium ions during charge/discharge cycles. As a result, the capacity can be increased while retaining satisfactory cycle characteristics.

The lithium complex oxide sintered plate has a porosity of 3 to 40%, more preferably 5 to 35%, further more preferably 7 to 30%, particularly more preferably 10 to 25%. A porosity of less than 3% causes the pore to insufficiently release the stress. A porosity exceeding 40% significantly diminishes the effect of increasing capacity.

According to a preferred embodiment of the present invention, the lithium complex oxide sintered plate has a mean pore diameter of 15 μm or less, an open pore rate of 70% or more, a thickness of 15 to 200 μm, and/or a primary grain diameter, i.e., a mean grain diameter of the plurality of primary grains, is 20 μm or less. The resulting thick lithium complex oxide sintered plate incorporated as a positive electrode into a lithium secondary battery, exhibits high performances, such as rapid charge/discharge characteristics, and having high energy density due to orientation of the (003) planes of primary grains at a mean angle of more than 0° to 30° or less to the plate face of a thick sintered plate. In order to achieve high capacity and high energy density, use of thick lithium complex oxide sintered plate is advantageous for positive electrodes or layers of positive electrode active material in miniaturized batteries. In contrast, miniaturized batteries for smart cards and wearable devices require specific performance depending on usage pattern. For example, rapid charge/discharge characteristics are desired in batteries used under a situation where users constantly carry them. However, it has been found that a liquid-base high energy density battery (thin lithium battery) including a thick conventional positive electrode plate of lithium complex oxide in combination with an organic electrolytic solution or an ionic liquid exhibits a reduction in capacity retention in charge/discharge cycle test at a high rate (2C). In contrast, the lithium complex oxide sintered plate in the present embodiment having the above configuration prevents or reduce the deterioration of the battery performance even during a cycle test at a high rate. Although the reason is not clear, it is believed that the stress which may be generated due to expansion and contraction at the time of charge and discharge is advantageously decreased by, for example, the orientation of the primary grains at the above specific mean tilt angle. As a result, the lithium complex oxide sintered plate in the present embodiment may has high energy density and large thickness, and exhibit superior performance, such as rapid charge/discharge performance, when incorporated as a positive electrode into a lithium secondary battery.

The lithium complex oxide sintered plate according to the preferred embodiment in the present invention has a mean pore diameter of 15 μm or less, preferably 12 μm or less, more preferably 10 μm or less. A mean pore diameter exceeding 15 μm leads to generation of relatively large pores. Such large pores usually do not have an exact spherical shape, but have irregular shapes. In such irregular shapes, the stress concentration is likely to occur at local sites in large pores. Accordingly, the stress cannot be uniformly released in the sintered plate. Although the lower limit of the mean pore diameter may be any value, the mean pore diameter is preferably 0.1 μm or more, and more preferably 0.3 μm or more from the viewpoint of the stress relief effect in the pores. As a result, the above range appropriately restrains the cracking at grain boundaries and separation at bonding interfaces.

The open pore rate of the lithium complex oxide sintered plate according to the preferred embodiment in the present invention is 70% or more, more preferably 80% or more, further more preferably 90% or more. The open pore rate may be 100%, typically 90% or less, more typically 80% or less. An open pore rate of 70% or more may more readily release the stress and effectively restrain the cracking at grain boundaries. This effect is likely to be caused by the following reasons. The expansion and contraction of the volume in the positive electrode are caused by the intercalation and deintercalation of lithium ions in the crystalline lattice as described above. The open pore is surrounded by the faces through which lithium ions intercalate and deintercalate. In this configuration, open pores are probably more effective in relieving stress than closed pores. An open pore rate of 70% or more can effectively restrain the separation at bonding interfaces. This advantage is believed to be based on high bonding strength due to an anchor effect caused by an increase in surface roughness by the incorporated open pores, as the open pores can be regarded as affecting surface roughness. In addition, the electrolytic solution and the conductive material contained in the open pores allows the inner walls of the open pores to effectively serve as surfaces through which lithium ions intercalate and deintercalate. An open pore rate of 70% or more can accordingly improve the rate characteristic as compared with a high closed pore rate in which many closed pores are present as mere pores (portions which do not contribute to charge/discharge).

Although the pores have any distribution pattern and any shape, the pores have a preferred distribution pattern and shape, because the grains composing the lithium complex oxide sintered plate typically have a uniform orientation and a predetermined aspect ratio. For example, the pores may be oriented so as to be in contact with the lithium ion conductive surface, or may have a shape that can be widely in contact with the lithium ion conductive surface (such as spherical or indefinite shape), or may be preferably a configuration having an aspect ratio that provides such an orientation and shape. In the case that the pores have such an aspect ratio, the pore shape having anisotropy defined by the aspect ratio can probably achieve superior performance, such as high flexibility and rapid charge/discharge performance, by appropriately dispersing the stress when the battery is warped, charged or discharged.

The lithium complex oxide sintered plate according to the preferred embodiment in the present invention has a thickness of 15 to 200 μm, preferably 30 to 150 μm, more preferably 50 to 100 μm. As described above, the lithium complex oxide sintered plate having larger thickness can lead to higher capacity and higher energy density. The thickness of the lithium complex oxide sintered plate is determined by measuring the distance between the two substantially parallel faces of the plate, for example, when the cross section of the lithium complex oxide sintered plate is observed by SEM (scanning electron microscopy).

The primary grain diameter, which is the mean grain diameter of the plurality of primary grains constituting the lithium complex oxide sintered plate, is 20 μm or less, preferably 15 μm or less. In general, as the primary grain diameter decreases, the number of grain boundaries increases. As the number of grain boundaries increases, the internal stress generated in the expansion and contraction of the crystalline lattice accompanying the charge and discharge cycles is appropriately dispersed. In addition, even when cracking occurs, a larger number of grain boundaries blocks the growth of cracks. In contrast, grains of the sintered plate in the present invention are highly orientated, and thereby the stress is not readily concentrated to the grain boundaries, resulting in high cycle characteristics even at large grain diameters. In addition, in the case that the grain diameters are large, the diffusion of lithium during charge and discharge cycles is less likely to be blocked at grain boundaries, which is suitable for rapid charge/discharge. The primary grain diameter is typically 0.2 μm or more, more typically 0.4 μm or more.

Process

The lithium complex oxide sintered plate in the present invention may be produced by any method, and preferably produced through (a) preparation of a green sheet containing a lithium complex oxide, and (b) firing of the green sheet.

(a) Preparation of Green Sheet Containing Lithium Complex Oxide

A raw material powder composed of lithium complex oxide is prepared. The powder preferably comprises pre-synthesized platy particles having a basic composition of $Li(Co,M)O_2$ where M is at least one selected from Mg, Ni, Al and Mn. The volume-based D50 particle diameter of the raw material powder is preferably 0.3 to 30 μm. For example, the $Li(Co,M)O_2$ platy particles can be produced as follows. $Co_3O_4$ powder, $Li_2CO_3$ powder, and powder of a compound containing a replaced element (e.g., $MgCO_3$ powder, $Ni(OH)_2$ powder, AlOOH powder, or $MnCO_3$ powder) are weighed and mixed in a predetermined proportion, and fired at 500 to 900° C. for 1 to 20 hours to synthesize $Li(Co,M)O_2$ powder. The resultant $Li(Co,M)O_2$ powder is pulverized into a volume-based D50 particle diameter of 0.2 μm to 10 μm with a pot mill to yield platy $Li(Co,M)O_2$ particles capable of conducting lithium ions along the faces of the plate. Such $Li(Co,M)O_2$ particles are also produced by a procedure involving grain growth in a green sheet from $Li(Co,M)O_2$ powder slurry and disintegration of the green sheet, or a procedure involving synthesis of platy crystals, such as a flux process, a hydrothermal synthesis process, a single crystal growth process using a melt, and a sol gel process. The resultant $Li(Co,M)O_2$ particles are readily cleaved along cleavage planes. The $Li(Co,M)O_2$ particles may be cleaved by crushing to produce $Li(Co,M)O_2$ platy particles.

The platy particles may be independently used as raw material powder, or a mixed powder of the platy powder and another raw material powder (e.g., $Co_3O_4$ particles and particles of compound containing element M) may be used as a raw material powder. In the latter case, it is preferred that the platy powder serves as template particles for providing orientation, and another raw material powder (e.g., $Co_3O_4$ particles and particles of compound containing element M) serves as matrix particles that can grow along the template particle. In this case, the raw material powder is preferably composed of a mixed powder in a ratio of template particles to matrix particles of 100:0 to 3:97. When the $Co_3O_4$ raw material powder and the powder of compound containing element M is used as the matrix particles, the volume-based D50 particle diameter of the $Co_3O_4$ raw material powder and the powder of compound containing element M may be any value, for example, 0.1 to 1.0 μm, and is preferably smaller than the volume-based D50 particle diameter of $Li(Co,M)O_2$ template particles. The Co-based matrix particles may also be produced by heating the $Co(OH)_2$ raw material at 500° C. to 800° C. for 1 to 10 hours. In addition to $Co_3O_4$, $Co(OH)_2$ particles may be used, or $LiCoO_2$ particles may be used as the Co-based matrix particles.

When the raw material powder is composed of 100% of $Li(Co,M)O_2$ template particles, or when $Li(Co,M)O_2$ particles are used as matrix particles, a large (e.g., 90 mm by 90 mm square) flat sintered $Li(Co,M)O_2$ plate can be yielded by firing. Although the mechanism is not clear, since synthesis of $LiCoO_2$ does not proceed in a firing process, a change in volume or local unevenness of the shape probably does not occur.

The raw material powder is mixed with a dispersive medium and any additive (e.g., binder, plasticizer, and dispersant) to form a slurry. Another lithium compound (e.g., lithium carbonate) in an excess amount of about 0.5 to 30 mol % may be added to the slurry to promote grain growth and compensate for a volatile component in a firing process described later. The slurry preferably contains no pore-forming agent. The slurry is defoamed by stirring under reduced pressure, and the viscosity is preferably adjusted into 4000 to 10000 cP. The resultant slurry is molded into a sheet to give a green sheet containing lithium complex oxide (e.g., $Li(Co,M)O_2$ green sheet). The resultant green sheet is in a form of independent sheet. An independent sheet (also referred to as a "self-supported film") refers to a sheet (including flakes having an aspect ratio of 5 or more) that can be independently handled in a singular form apart from other supports. In other words, the independent sheet is not the one that is fixed to a support (such as a substrate) and integrated with the support (so as to be inseparable or hard to separate). The sheet is preferably formed by a procedure capable of applying a shear force to platy particles (for example, template particles) in the raw material powder. Through this process, the primary particles can have a mean tilt angle of more than 0° to 30° or less to the plate face. The procedure capable of applying a shear force to platy particles suitably includes a doctor blade process. The thickness of the green sheet containing the lithium complex oxide may be appropriately selected so as to give the above desired thickness after firing.

(b) Firing of Green Sheet

The green sheet containing the lithium complex oxide (e.g., $Li(Co,M)O_2$ green sheet) is disposed on a bottom setter, and a top setter is disposed on the green sheet. The top and bottom setters are made of ceramic, preferably zirconia or magnesia. If the setters are made of magnesia, the pores tend to get smaller. The top setter may have a porous structure, a honeycomb structure, or a dense structure. If the top setter has a dense structure, the pores in the sintered plate readily get smaller, and the number of pores tends to get larger.

After the green sheet containing the lithium complex oxide (e.g., $Li(Co,M)O_2$ green sheet) is placed on the bottom setter, the green sheet may be optionally degreased and then calcined at 600 to 850° C. for 1 to 10 hours.

The green sheet and/or the calcined plate disposed between the setters are optionally degreased and heated (fired) in a medium temperature range (e.g., 700 to 1000° C.) to give a lithium complex oxide sintered plate (e.g., $Li(Co, M)O_2$ green sheet). This firing process may be performed in one or two steps. In the case of firing in two separate steps, the temperature in the first firing step is preferably lower than that in the second firing step. The resultant sintered plate is also in a form of independent sheet.

Lithium Secondary Battery

The lithium complex oxide sintered plate according to the present invention is usable in a positive electrode of a lithium secondary battery. A preferred embodiment of the present invention provides a lithium secondary battery including the lithium complex oxide sintered plate as a positive electrode. This battery typically comprises the positive electrode including the lithium complex oxide sintered plate in the present invention, a negative electrode, and an electrolytic solution. The negative electrode may be a known negative electrode generally used in lithium secondary batteries. The electrolytic solution may be a known electrolytic solution generally used for lithium secondary batteries.

When a laminate battery is manufactured with the sintered plate of the present invention as a positive electrode plate, the sintered plate may be optionally attached to a laminate current collector to improve the contact with the current collector or to avoid the movement of the positive electrode plate inside the battery.

In addition, an electrolytic solution may contain one or more selected from γ-butyrolactone, propylene carbonate, and ethylene carbonate in an amount of 96% by volume or more. Such an electrolytic solution can be used to operate the battery at high temperature, and stably manufacture a battery without deterioration of the battery in manufacturing at high temperature. In particular, in the case that the electrolytic solution contains no ethylene carbonate or at most 20% by volume ethylene carbonate, a ceramic plate of, for example, $Li_4Ti_5O_{12}$ (LTO), $Nb_2TiO_7$, and $TiO_2$, can be suitably employed as a negative electrode material.

In particular, a laminate battery manufactured with the lithium complex oxide sintered plate in the present invention as a positive electrode plate is characterized in that no binder represented by polyvinylidene fluoride (PVDF) is contained, unlike general coated electrodes. Accordingly, an electrolytic solution containing γ-butyrolactone, which has high heat resistance, can be employed in the laminate battery, because the battery contains no binder represented by PVDF, which is decomposed at high temperature (e.g., 80° C. or more). As a result, the battery can be advantageously operated at a high temperature, and manufactured through a high temperature process at about 120° C.

Any negative electrode commonly used in a lithium secondary battery can be employed in the laminate battery manufactured with the lithium complex oxide sintered plate in the present invention as a positive electrode plate. Examples of such common negative electrode materials include carbonaceous materials, metals and metalloids, such as Li, In, Al, Sn, Sb, Bi, and Si, and alloys containing these metals and metalloids. In addition, an oxide-based negative electrode, such as lithium titanate ($Li_4Ti_5O_{12}$), may be used. The oxide-based negative electrode may be prepared by mixing and coating a negative electrode active material, such as lithium titanate, with a binder and a conductive aid, and may be a ceramic plate prepared by sintering a negative electrode active material, such as lithium titanate. In the latter case, the ceramic plate may be dense or may have open pores inside the plate. The use of lithium titanate as the negative electrode layer has an advantage in that the reliability and power output performance are greatly improved as compared with the use of carbonaceous material. In addition, the lithium secondary battery manufactured with a negative electrode of lithium titanate and the lithium complex oxide sintered plate in the present invention exhibits high reliability, such as high cycle performance and high storage performance (less self-discharge), and thereby can be used in series by simple control.

$TiO_2$ or $Nb_2TiO_7$ may be used as the negative electrode active material. In this case, the negative electrode material may be prepared by coating of a mixture of the above negative electrode active material, a binder and a conductive aid, or may be a ceramic plate prepared by sintering the negative electrode active material. In the latter case, the ceramic plate may be dense or may have open pores inside the plate. The use of these materials as the negative electrode layer has an advantage in that the reliability and power output performance are more greatly improved as compared with the use of a carbonaceous material, and also an advantage in that the energy density is higher than the use of lithium titanate material. The use of these materials as the negative electrode layer can exhibit high reliability, such as high cycle performance and high storage performance similar to the use of lithium titanate, and can be readily used in series.

EXAMPLES

The invention will be illustrated in more detail by the following examples.

Examples A1 to A4

(1) Production of Positive Electrode Plate
(1a) Preparation of Li(Co,Mg)O₂ Green Sheet $Co_3O_4$ powder (mean particle diameter D50: 0.9 µm, manufactured by Seido Chemical Industry Co., Ltd.), $Li_2CO_3$ powder (manufactured by The Honjo Chemical Corporation) and $MgCO_3$ powder (manufactured by Kamijima Chemical Co., Ltd.) are weighed and mixed to give formula $(Li_{1.02}Co_{0.995}Mg_{0.005})O_2$ (Example 1), $(Li_{1.02}Co_{0.98}Mg_{0.02})O_2$ (Example 2), $(Li_{1.02}Co_{0.95}Mg_{0.05})O_2$ (Example 3), or $(Li_{1.02}Co_{0.90}Mg_{0.10})O_2$ (Example 4). The resultant mixture was held at 800° C. for five hours to give calcined powder. The calcined powder was pulverized with a pot mill such that the mean particle diameter D50 was 0.5 µm. The resultant powder (100 parts by weight), a dispersion medium (toluene: 2-propanol=1:1)(100 parts by weight), a binder (polyvinyl butyral BM-2 manufactured by Sekisui Chemical Co., Ltd.)(10 parts by weight), a plasticizer (di (2-ethylhexyl) phthalate (DOP), manufactured by Kurogane Chemical Co., Ltd.) (4 parts by weight) and a dispersant (LEODOL SP-030 manufactured by Kao Corporation) (2 parts by weight) were mixed. The mixture was defoamed by stirring under reduced pressure to prepare an Li(Co,Mg)O₂ slurry with a viscosity of 4000 cP. The viscosity was measured with an LVT viscometer manufactured by Brookfield. The slurry was shaped into a green sheet onto a PET film by a doctor blade process. The dried thickness of the green sheet was 60 µm.

(1b) Preparation of Sintered Li(Co,Mg)O₂ Plate

The Li(Co,Mg)O₂ green sheet was separated from the PET film, and was cut into a 50 mm square. The cut piece was placed on the center of a bottom magnesia setter (dimensions: 90 mm square, height: 1 mm) and a top magnesia setter was placed thereon. The green sheet piece disposed between the top and bottom setters were placed into an alumina sheath of a 120 mm square (manufactured by Nikkato Co., Ltd.). At this time, the alumina sheath was not tightly sealed, and was covered with a lid with a gap of 0.5 mm. The laminate was heated to 600° C. at a heating rate of 200° C./h, and was degreased for three hours. The laminate was then heated to 800° C., and was fired for 20 hours. The fired laminate was then cooled to room temperature, and was removed from the alumina sheath. A positive electrode plate of a sintered Li(Co,Mg)O₂ plate was thereby yielded. The positive electrode plate was shaped by laser machining into a square of 9 mm by 9 mm.

(2) Manufacturing of Battery

A sintered Li(Co,Mg)O₂ plate (positive electrode plate), a separator, and a coated $Li_4Ti_5O_{12}$ electrode (negative electrode, manufactured by Hachiyama co., Ltd.) were stacked in sequence to prepare a laminate. The laminate was immersed in an electrolytic solution to manufacture a laminate battery. The electrolytic solution was a solution of $LiPF_6$ (1 mol/L) in equivolume mixed solvent of propylene carbonate (PC) and diethyl carbonate (DEC). The separator was a 25 µm-thick porous single-layer membrane made of cellulose (manufactured by Nippon Kodoshi Corporation).

(3) Evaluation

The sintered Li(Co,Mg)O$_2$ plate (positive electrode plate) prepared in Procedure (1b) and the battery manufactured in Procedure (2) were evaluated for various properties as shown below.

<Substitution Element and Replacement Rate>

The molar amount $A_M$ of the substitution element M (Mg in this example) and the molar amount $A_{Co}$ of Co shown in Table 1 are measured by ICP emission spectral analysis, and the replacement rate R (%) of the Co site by the substitution element M was calculated by the following expression:

$R=[A_m/(A_{Co}+A_m)]\times 100$.

<Porosity>

The sintered Li(Co,Mg)O$_2$ plate was polished with a cross-section polisher (CP) (IB-15000CP, manufactured by JEOL Ltd.), and the cross-section of the positive electrode plate was observed with a SEM (JSM 6390 LA, manufactured by JEOL Ltd.) at a 1000-fold field of view (125 μm×125 μm). The SEM image was subjected to an image analysis, the total area of all pores was divided by the area of the positive electrode, and the resultant value was multiplied by 100 to calculate the porosity (%).

<Mean Tilt Angle of Primary Grains>

The sintered Li(Co,Mg)O$_2$ plate was polished with a cross-section polisher (CP) (IB-15000CP, manufactured by JEOL Ltd.), and the cross-section of the positive electrode plate (cross-section perpendicular to the plate face of the positive electrode plate) was subjected to EBSD measurement at a 1000-fold field of view (125 μm×125 μm) to give an EBSD image. The EBSD was performed using a Schottky field emission scanning electron microscope (model JSM-7800F, manufactured by JEOL Ltd.). For all grains in the EBSD image, the angle defined by the (003) planes of the primary grain and the face of the positive electrode plate (the tilt of the crystal orientation from the (003) plane) is determined to be a tilt angle. The mean value of the angles was defined as a mean tilt angle of the primary grains.

<Noise Rate in Charge/Discharge Curve>

The battery was repeatedly charged and discharged, and the noise rate was examined in a charge/discharge curve. In detail, the charge/discharge cycle was repeated 200 times at a charge/discharge rate of 1 C in the potential range of 2.7 to 1.5 V. If three or more positive peaks were observed in a differential charge/discharge curve in the 200th cycle, occurrence of noises was determined. This measurement was performed for ten cells. The noise rate (%) was calculated through dividing the number of cells involving the occurrence of noises by ten, which is the total number of measured cells, and multiplying the resultant value by 100.

Example A5

A positive electrode plate and a battery were prepared as in Example A2 except that the negative electrode was a graphite electrode (manufactured by JFE Techno-Research Corporation) in place of the coated Li$_4$Ti$_5$O$_{12}$ electrode, and the electrolytic solution was prepared using ethylene carbonate (EC) in place of propylene carbonate (PC). The properties were evaluated as in Example A2 except that the measured potential of the charge/discharge cycle at a charge/discharge rate of 1 C was 4.3 to 3.0V in the evaluation of the noise rate.

Example A6

A positive electrode plate and a battery were prepared and evaluated as in Example A2 except that Ni(OH)$_2$ powder was used instead of MgCO$_3$ powder, that is, the substitution element M was Ni instead of Mg.

Example A7

A positive electrode plate and a battery were prepared and evaluated for the various properties as in Example A2 except that MnCO$_3$ powder was used instead of MgCO$_3$ powder, that is, the substitution element M was Mn instead of Mg.

Example A8

A positive electrode plate and a battery were prepared and evaluated for the various properties as in Example A2 except that AlOOH powder was used instead of MgCO$_3$ powder, that is, the substitution element M was Al instead of Mg.

Example A9 (Comparative)

A positive electrode plate and a battery were prepared and evaluated for the various properties as in Example A1 except that MgCO$_3$ powder was not added, that is, the substitution element M was not added.

Example A10 (Comparative)

A positive electrode plate and a battery were prepared and evaluated for the various properties as in Example A2 except that Co$_3$O$_4$ powder has a mean particle diameter D50 of 0.3 μm.

Example A11 (Comparative)

A positive electrode plate and a battery were prepared and evaluated for the various properties as in Example A10 except that MgCO$_3$ powder was not added, that is, the substitution element M was not added.

Results of Evaluation

Table 1 illustrates the results of evaluation for Examples A1 to A11.

TABLE 1

| | Substitution element M | Substitutional rate (mol %) | Mean tilt angle (°) | Porosity (vol %) | Noise rate (%) |
|---|---|---|---|---|---|
| Ex. A1 | Mg | 0.5 | 15 | 20 | 0 |
| Ex. A2 | Mg | 2 | 15 | 20 | 0 |
| Ex. A3 | Mg | 5 | 15 | 20 | 0 |
| Ex. A4 | Mg | 10 | 15 | 20 | 0 |
| Ex. A5 | Mg | 2 | 15 | 20 | 0 |
| Ex. A6 | Ni | 2 | 15 | 20 | 0 |
| Ex. A7 | Mn | 2 | 15 | 20 | 0 |
| Ex. A8 | Al | 2 | 15 | 20 | 0 |
| Ex. A9* | — | 0 | 15 | 20 | 40 |
| Ex. A10* | Mg | 2 | non-oriented (random) | 20 | 50 |
| Ex. A11* | — | 0 | non-oriented (random) | 20 | 100 |

*comparative example

Examples B1 to B16

Although Examples B1 to B16 described below are reference or comparative examples on a sintered LiCoO$_2$ plates that contain no substitution element M, the Examples are added to assist in the technical understanding regarding the sintered plates in the present invention. Accordingly, the sintered plates in the present invention can be manufactured through partial replacement of Co with the element M based on Examples B1 to B14 (reference).

Example B1 (Reference)

(1) Production of Positive Electrode Plate
(1a) Preparation of $LiCoO_2$ Green Sheet As shown in Table 2, $LiCoO_2$ raw material powder 1 was prepared and was named powder A. The $LiCoO_2$ powder A (100 parts by weight), a dispersive medium (toluene:2-propanol=1:1) (100 parts by weight), a binder (polyvinyl butyral: Product No. BM-2, manufactured by Sekisui Chemical Co., Ltd.) (10 parts by weight), a plasticizer (di-2-ethylhexyl phthalate (DOP), manufactured by Kurogane Kasei Co., Ltd.) (4 parts by weight), and a dispersant (product name: RHEODOL SP-030, manufactured by Kao Corporation) (2 parts by weight) were mixed. The mixture was defoamed by stirring under reduced pressure to prepare an $LiCoO_2$ slurry with a viscosity of 4000 cP. The viscosity was measured with an LVT viscometer manufactured by Brookfield. The slurry was molded into an $LiCoO_2$ green sheet onto a PET film by a doctor blade process. The dried thickness of the $LiCoO_2$ green sheet was 60 μm.

(1b) Preparation of $Li_2CO_3$ Green Sheet (Excess-Lithium Source)

$Li_2CO_3$ raw material powder (volume-based particle diameter D50: 2.5 μm, manufactured by The Honjo Chemical Corporation) (100 parts by weight), a binder (poly(vinyl butyral): Product No. BM-2, manufactured by Sekisui Chemical Co., Ltd.) (5 parts by weight), a plasticizer di-2-ethylhexyl phthalate (DOP), manufactured by Kurogane Kasei Co., Ltd.) (2 parts by weight), and a dispersant (RHEODOL SP-030, manufactured by Kao Corporation) (2 parts by weight) were mixed. The mixture was defoamed by stirring under reduced pressure to prepare a $Li_2CO_3$ slurry with a viscosity of 4000 cP. The viscosity was measured with an LVT viscometer manufactured by Brookfield. The $Li_2CO_3$ slurry was molded into a $Li_2CO_3$ green sheet on a PET film by a doctor blade process. The dried thickness of the $Li_2CO_3$ green sheet was controlled such that the Li/Co molar ratio of the Li content in the $Li_2CO_3$ green sheet to the Co content in the $LiCoO_2$ green sheet had a predetermined value.

(1c) Preparation of Sintered $LiCoO_2$ Plate

The $LiCoO_2$ green sheet was separated from the PET film, and was cut into a 50 mm square. The cut piece was placed on the center of a bottom magnesia setter (dimensions: 90 mm square, height: 1 mm). The $LiCoO_2$ green sheet was heated to 600° C. at a heating rate of 200° C./h, and was degreased for three hours. The $LiCoO_2$ green sheet was then kept at 900° C. for three hours to calcine the $LiCoO_2$ green sheet. The dried $Li_2CO_3$ green sheet was cut into a size such that the Li/Co molar ratio of the Li content in the $Li_2CO_3$ green sheet to the Co content in the calcined $LiCoO_2$ plate was 0.5. The cut piece of the $Li_2CO_3$ green sheet, as an excess-lithium source, was placed on the calcined $LiCoO_2$ plate, and a porous top magnesia setter was placed thereon. The calcined $LiCoO_2$ plate and the green sheet piece disposed between the top and bottom setters were placed into an alumina sheath of a 120 mm square (manufactured by Nikkato Co., Ltd.). At this time, the alumina sheath was not tightly sealed, and was covered with a lid with a gap of 0.5 mm. The laminate was heated to 600° C. at a heating rate of 200° C./h, and was degreased for three hours. The laminate was then heated to 800° C. at 200° C./h, and was kept for five hours. The laminate was then heated to 900° C. at 200° C./h, and was kept for 20 hours to fire. After the firing, the fired laminate was cooled to room temperature, and was removed from the alumina sheath. Thus, the sintered $LiCoO_2$ plate was yielded as a positive electrode plate. The positive electrode plate was shaped with a laser into a square of 9 mm by 9 mm.

(2) Manufacturing of Battery

The positive electrode plate, a separator, and a carbonaceous negative electrode were disposed in sequence to prepare a laminate. The laminate was immersed in an electrolytic solution to manufacture a laminate battery. The electrolytic solution was a solution of $LiPF_6$ (1 mol/L) in equivolume mixed solvent of ethylene carbonate (EC) and diethyl carbonate (DEC). The separator was a 25 μm-thick single-layer membrane made of porous polypropylene (Celgard 2500™, manufactured by Celgard, LLC).

(3) Evaluation

The sintered $LiCoO_2$ plate (positive electrode plate) prepared in Procedure (1c) and the battery manufactured in Procedure (2) were evaluated for various properties as shown below.

<Porosity>

The sintered $LiCoO_2$ plate was polished with a cross section polisher (CP) (IB-15000CP, manufactured by JEOL Ltd.), and the cross-section of the positive electrode plate was observed with SEM (JSM 6390 LA, manufactured by JEOL Ltd.) at a 1000-fold field of view (125 μm×125 μm). The SEM image was subjected to an image analysis, the area of all pores was divided by the area of the positive electrode, and the resultant value was multiplied by 100 to calculate the porosity (%).

<Mean Pore Diameter>

The mean pore diameter of the sintered $LiCoO_2$ plate was measured by a mercury intrusion method using a mercury porosimeter (Autopore IV 9510, manufactured by Shimadzu Corporation).

<Open Pore Rate>

The open pore rate of the sintered $LiCoO_2$ plate was determined by the Archimedes method. In detail, the closed porosity was determined from the apparent density measured by the Archimedes method, and the total porosity was determined from the bulk density measured by the Archimedes method. The open pore rate was then determined from the closed porosity and the total porosity by the following expression:

$$\begin{aligned}(\text{open pore rate}) &= (\text{open porosity})/(\text{total porosity}) \\ &= (\text{open porosity})/[(\text{open porosity}) + (\text{closed porosity})] \\ &= [(\text{total porosity}) - (\text{closed porosity})]/(\text{total porosity})\end{aligned}$$

<Mean Tilt Angle of Primary Grains>

The sintered $LiCoO_2$ plate was polished with a cross section polisher (CP) (IB-15000CP, manufactured by JEOL Ltd.), and the cross-section of the positive electrode plate (cross-section perpendicular to the plate face of the positive electrode plate) was subjected to the EBSD measurement at a 1000-fold field of view (125 μm×125 μm) to give an EBSD image. This EBSD was performed using a Schottky field emission scanning electron microscope (model JSM-7800F, manufactured by JEOL Ltd.). For all grains identified in the resultant EBSD image, the angle defined by the (003) planes of the primary grains and the plate face of the positive electrode plate (that is, the tilt of the crystal orientation from the (003) plane) is determined as a tilt angle. The mean value of the angles was determined as a mean tilt angle of the primary grains.

<Rate of Primary Grains Having Tilt Angle of 0° or More to 30° or Less>

In the EBSD image, the ratio of the total area of primary grains having an tilt angle of 0° to 30° to the total area of the primary grains (that is, the ratio of the area included within the range of 0 to 30° from the (003) plane) was calculated, and the resultant value was determined as a rate (%) of the primary grains having an tilt angle of 0° to 30°.

<Diameter of Primary Grains>

The sintered $LiCoO_2$ plate was polished with a cross section polisher (CP) (IB-15000CP, manufactured by JEOL Ltd.), and the cross-section of the positive electrode plate was observed with SEM (JSM 6390 LA, manufactured by JEOL Ltd.) at a 1000-fold field of view (125 μm×125 μm). At this time, a field of view containing 20 or more primary grains was selected. Circumscribed circles were drawn around all the primary grains in the resultant SEM image to measure the diameters of the circumscribed circles, and a mean value of the diameters was determined as a primary grain diameter.

<Thickness>

The sintered $LiCoO_2$ plate was polished with a cross section polisher (CP) (IB-15000CP, manufactured by JEOL Ltd.), and the resultant cross-section of positive electrode plate was observed with SEM (JSM 6390 LA, manufactured by JEOL Ltd.) to determine a thickness of the positive electrode plate. The thickness of the dried $LiCoO_2$ green sheet described above in Procedure (1a) was also determined in the same manner.

<Capacity Retention after High-Rate Charge/Discharge Cycles>

The capacity retention of a battery after high-rate charge/discharge cycles was measured in the potential range of 4.2 V to 3.0 V by the following procedures.

(i) The battery was charged at a rate of 0.2 C under a constant current until the battery voltage reached 4.2 V, was charged under a constant voltage until the current value reached a rate of 0.02 C, and then was discharged at a rate of 0.2 C until the voltage reached 3.0 V. This charge/discharge cycle was repeated three times in total to measure the discharge capacities. The averaged value was defined as an initial discharge capacity.

(ii) The battery was charged and discharged at a high charge rate of 2 C and a high discharge rate of 2 C fifty times in total.

(iii) The battery was charged at a rate of 0.2 C under a constant current until the battery voltage reached 4.2 V, was charged under a constant voltage until the current reached a rate of 0.02 C, and then was discharged at a rate of 0.2 C until the voltage reached 3.0 V. This charge/discharge cycle was repeated three times in total to measure the discharge capacities. The averaged value was defined as a post-cycle discharge capacity after high-rate charge/discharge cycles.

(iv) The ratio of the post-cycle discharge capacity measured in Procedure (iii) to the initial discharge capacity measured in Procedure (i) was calculated, and the ratio was multiplied by 100 to determine the capacity retention (%) after high-rate charge/discharge cycles.

Example B2 (Reference)

A positive electrode plate and a battery were prepared and evaluated for the various properties as in Example B1 except that 1) degreasing and calcination were not carried out, and 2) the size of the $Li_2CO_3$ green sheet piece to be placed was varied so as to have a Li/Co ratio of 0.4.

Example B3 (Reference)

A positive electrode plate and a battery were prepared and evaluated for the various properties as in Example B2 except that $Li_2CO_3$ raw material powder (a volume-based D50 particle diameter of 2.5 μm, manufactured by Honjo Chemical Co., Ltd.) was further added to the $LiCoO_2$ slurry to have an excess-Li/Co ratio of 0.1 in the $LiCoO_2$ green sheet. The excess-Li/Co ratio is the molar ratio of the excess-Li content derived from $Li_2CO_3$ in the $LiCoO_2$ green sheet to the Co content in the $LiCoO_2$ green sheet.

Example B4 (Reference)

A positive electrode plate and a battery were prepared and evaluated for the various properties as in Example B1 except that 1) powder B corresponding to $LiCoO_2$ raw material powder 3 produced as shown in Table 2 was used instead of powder A, 2) the calcination temperature was 800° C., and 3) the size of the $Li_2CO_3$ green sheet piece to be placed was varied so as to have a Li/Co ratio of 0.4.

Example B5 (Reference)

A positive electrode plate and a battery were prepared and evaluated for the various properties as in Example B1 except that 1) powder C corresponding to $LiCoO_2$ raw material powder 2 produced as shown in Table 2 was used instead of powder A, and 2) the size of the $Li_2CO_3$ green sheet piece to be placed was varied so as to have a Li/Co ratio of 0.4.

Example B6 (Reference)

A positive electrode plate and a battery were prepared and evaluated for the various properties as in Example B1 except that 1) the size of the $Li_2CO_3$ green sheet piece to be placed was varied so as to have a Li/Co ratio of 0.4, and 2) the firing time at 900° C. was 40 hours.

Example B7 (Reference)

A positive electrode plate and a battery were prepared and evaluated for the various properties as in Example B2 except that the $LiCoO_2$ green sheet was molded to have a dried thickness of 20 μm.

Example B8

A positive electrode plate and a battery were prepared and evaluated for the various properties as in Example B2 except that the $LiCoO_2$ green sheet was molded to have a dried thickness of 120 μm.

Example B9

A positive electrode plate and a battery were prepared and evaluated for the various properties as in Example B1 except that 1) the calcination temperature was 700° C. and 2) the size of the $Li_2CO_3$ green sheet piece to be placed was varied so as to have a Li/Co ratio of 0.6.

Example B10 (Reference)

A positive electrode plate and a battery were prepared and evaluated for the various properties as in Example B1 except that 1) the size of the Li$_2$CO$_3$ green sheet piece to be placed was varied so as to have a Li/Co ratio of 0.4, 2) the firing time at 800° C. was 10 hours, and 3) the firing at 900° C. was not performed.

Example B11 (reference)

A positive electrode plate and a battery were prepared and evaluated for the various properties as in Example B2 except that 1) LiCoO$_2$—Co$_3$O$_4$ mixture powder D containing raw material powders 1, 3 and 4 as shown in Table 2 in a ratio of 33:33:34 (by weight) was used instead of powder A, and 2) the size of the Li$_2$CO$_3$ green sheet piece to be placed was varied so as to have a Li/Co ratio of 1.1.

Example B12 (Reference)

A positive electrode plate and a battery were prepared and evaluated for the various properties as in Example B2 except that LiCoO$_2$—Co$_3$O$_4$ mixture powder E containing raw material powders 2 and 5 as shown in Table 2 in a ratio of 50:50 (by weight) was used instead of powder A.

Example B13 (Reference)

A positive electrode plate and a battery were prepared and evaluated for the various properties as in Example B1 except that 1) LiCoO$_2$—Co$_3$O$_4$ mixture powder F containing raw material powders 1, 2 and 5 as shown in Table 2 in a ratio of 50:25:25 (by weight) was used instead of powder A, and 2) the calcination temperature was 800° C.

Example B14 (Reference)

A positive electrode plate and a battery were prepared and evaluated for the various properties as in Example B1 except that 1) LiCoO$_2$—Co$_3$O$_4$ mixture powder G containing raw material powders 1 and 4 as shown in Table 2 in a ratio of 25:75 (by weight) was used instead of powder A, 2) the calcination temperature was 800° C., and 3) the size of the Li$_2$CO$_3$ green sheet piece to be placed was varied so as to have a Li/Co ratio of 0.4.

Example B15 (Comparative)

A positive electrode plate and a battery were prepared and evaluated for the various properties as in Example B1 except that 1) LiCoO$_2$—Co$_3$O$_4$ mixture powder H containing raw material powders 1 and 4 as shown in Table 2 in a ratio of 25:75 (by weight) was used instead of powder A, and 2) the size of the Li$_2$CO$_3$ green sheet piece to be placed was varied so as to have a Li/Co ratio of 1.2.

Example B16 (Comparative)

A positive electrode plate and a battery were prepared and evaluated for the various properties as in Example B1 except that 1) Co$_3$O$_4$—Bi$_2$O$_3$ mixture powder I containing raw material powders 5 and 6 as shown in Table 2 in a ratio of 95:5 (by weight) was used instead of powder A, and thereby a Co$_3$O$_4$ green sheet containing Bi$_2$O$_3$ as an aid was used instead of the LiCoO$_2$ green sheet, 2) the size of the Li$_2$CO$_3$ green sheet piece to be placed was varied so as to have a Li/Co ratio of 1.2, 3) the calcination was performed at 1300° C. for five hours, 4) firing was performed at 850° C. for 20 hours, and 5) firing was not performed at 900° C.

Process Conditions and Results of Evaluation

Figure 2:
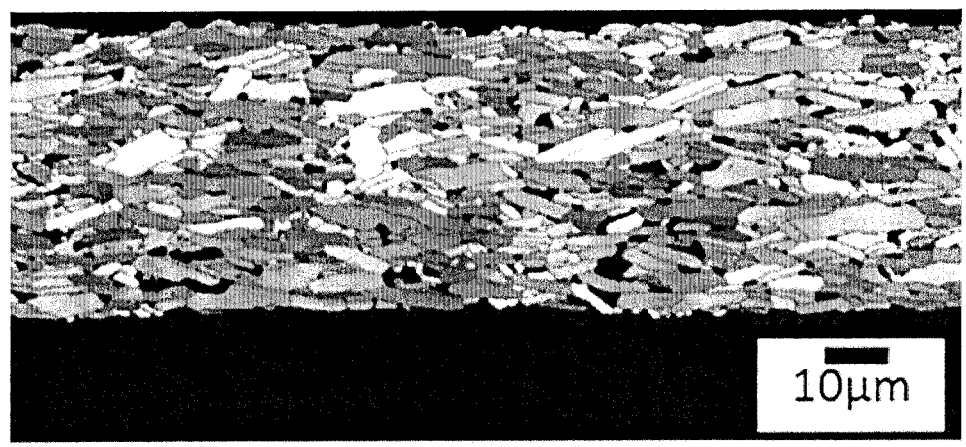
FIG. 2 is a cross-sectional EBSD image of a lithium complex oxide sintered plate produced in Example B1 in the observed area shown in FIG. 1.
Figure 2:
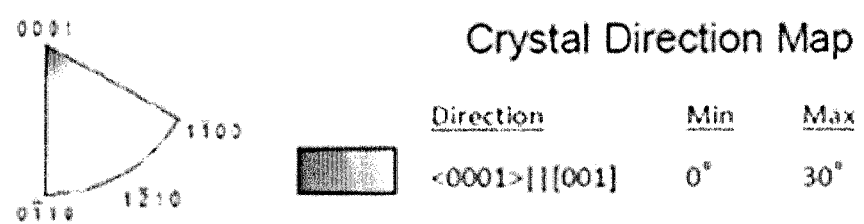

Table 3 shows the process conditions in Examples B1 to B16, and Table 4 shows the results of evaluation in Examples B1 to B16. In addition, Table 2 shows the mixing ratio of the raw material powders 1 to 6 in each of the powders A to I indicated in Table 3. Furthermore, FIG. 1 illustrates a SEM image of the polished cross-section (cross-section perpendicular to the plate face) of the lithium complex oxide sintered plate in Example B1, and FIG. 2 illustrates a cross-sectional EBSD image of the lithium complex oxide sintered plate in Example B1 in the observed region shown in FIG. 1. The particle diameters of the raw material powders shown in Table 2 were measured by a laser diffraction/scattering particle diameter distribution measuring device (Microtrac MT 3000 II, manufactured by MicrotracBell Corpotration).

TABLE 2

| | | Proportion of raw material powders in each mixture (weight %) | | | | | | | | |
|---|---|---|---|---|---|---|---|---|---|---|
| | Raw powder | A | B | C | D | E | F | G | H | I |
| 1 | LiCoO$_2$ platy particles produced through mixing Co$_3$O$_4$ powder (manufactured by Seido Chemical Industry Co., Ltd.) and Li$_2$CO$_3$ powder (manufactured by The Honjo Chemical Corporation) in a Li/Co molar ratio of 1.02, heating to 750° C., keeping for five hours, and pulverizing the particles into a volume-based D50 of 0.4 μm with a pot mill | 100 | — | — | 33 | — | 50 | 25 | 5 | — |
| 2 | LiCoO$_2$ platy particles produced through mixing Co$_3$O$_4$ powder (manufactured by Seido Chemical Industry Co., Ltd.) and Li$_2$CO$_3$ powder (manufactured by The Honjo Chemical Corporation) in a Li/Co molar ratio of 1.02, heating to 750° C., keeping for five hours, and pulverizing the particles into a volume-based D50 of 1.0 μm with a pot mill | — | — | 100 | — | 50 | 25 | — | — | — |
| 3 | LiCoO$_2$ platy particles produced through mixing Co$_3$O$_4$ powder (manufactured by Seido Chemical Industry Co., Ltd.) and Li$_2$CO$_3$ powder (manufactured by The Honjo Chemical Corporation) in a Li/Co molar ratio of 1.02, heating to 600° C., keeping for five hours, and pulverizing the particles into a volume-based D50 of 0.2 μm with a pot mill | — | 100 | — | 33 | — | — | — | — | — |
| 4 | Co$_3$O$_4$ powder produced through heating Co(OH)$_2$ powder (manufactured by Wako Pure Chemical Corporation) to 600° C. and keeping for three hours | — | — | — | 34 | — | — | 75 | 95 | — |
| 5 | Co$_3$O$_4$ powder (manufactured by Seido Chemical Industry Co., Ltd., a volume-based D50 of 0.8 μm) | — | — | — | — | 50 | 25 | — | — | 95 |
| 6 | Bi$_2$O$_3$ powder (a D50 of 0.3 μm) | — | — | — | — | — | — | — | — | 5 |

TABLE 3

|  | Powder used | Thickness of plate (μm) | Internal excess-litium source Excess-Li/Co ratio corresponding to Li$_2$CO$_3$ content in LiCoO$_2$ green sheet | External excess-litium source Li/Co ratio corresponding to Li$_2$CO$_3$ content in Li$_2$CO$_3$ green sheet | Calcining conditions | Main firing conditions |
|---|---|---|---|---|---|---|
| Ex. B1* | A | 60 | 0 | 0.5 | 900° C. × 3 h | 800° C. × 5 h followed by 900° C. × 20 h |
| Ex. B2* | A | 60 | 0 | 0.4 | — | 800° C. × 5 h followed by 900° C. × 20 h |
| Ex. B3* | A | 60 | 0.1 | 0.4 | — | 800° C. × 5 h followed by 900° C. × 20 h |
| Ex. B4* | B | 60 | 0 | 0.4 | 800° C. × 3 h | 800° C. × 5 h followed by 900° C. × 20 h |
| Ex. B5* | C | 60 | 0 | 0.4 | 900° C. × 3 h | 800° C. × 5 h followed by 900° C. × 20 h |
| Ex. B6* | A | 60 | 0 | 0.4 | 900° C. × 3 h | 800° C. × 5 h followed by 900° C. × 40 h |
| Ex. B7* | A | 20 | 0 | 0.4 | — | 800° C. × 5 h followed by 900° C. × 20 h |
| Ex. B8* | A | 120 | 0 | 0.4 | — | 800° C. × 5 h followed by 900° C. × 20 h |
| Ex. B9* | A | 60 | 0 | 0.6 | 700° C. × 3 h | 800° C. × 5 h followed by 900° C. × 20 h |
| Ex. B10* | A | 60 | 0 | 0.1 | 900° C. × 3 h | 800° C. × 10 h |
| Ex. B11* | D | 60 | 0 | 1.1 | — | 800° C. × 5 h followed by 900° C. × 20 h |
| Ex. B12* | E | 60 | 0 | 0.4 | — | 800° C. × 5 h followed by 900° C. × 20 h |
| Ex. B13* | F | 60 | 0 | 0.5 | 800° C. × 3 h | 800° C. × 5 h followed by 900° C. × 20 h |
| Ex. B14 | G | 60 | 0 | 0.4 | 800° C. × 3 h | 800° C. × 5 h followed by 900° C. × 20 h |
| Ex. B15* | H | 60 | 0 | 1.2 | 900° C. × 3 h | 800° C. × 5 h followed by 900° C. × 20 h |
| Ex. B16* | I | 60 | 0 | 1.2 | 1300° C. × 5 h | 800° C. × 20 h |

*reference example
*comparative example

TABLE 4

|  | Porosity (%) | Mean pore diameter (μm) | Open pore rate (%) | Mean tilt angle of primary grains (°) | Rate of primary grains having tilt angle of 0° to 30° (%) | Primary grain diameter (μm) | Thickness of plate (μm) | Capacity retention after high-rate charge/discharge cycles (%) |
|---|---|---|---|---|---|---|---|---|
| Ex. B1* | 5 | 0.8 | 90 | 16° | 80.0 | 4.0 | 50 | 96.5 |
| Ex. B2* | 15 | 0.8 | 95 | 16° | 80.0 | 4.0 | 50 | 97.0 |
| Ex. B3* | 40 | 0.8 | 95 | 16° | 80.0 | 4.0 | 50 | 97.2 |
| Ex. B4* | 15 | 0.1 | 80 | 16° | 80.0 | 4.0 | 50 | 96.0 |
| Ex. B5* | 15 | 10.0 | 95 | 16° | 80.0 | 4.0 | 50 | 96.3 |
| Ex. B6* | 15 | 0.8 | 70 | 16° | 80.0 | 4.0 | 50 | 96.4 |
| Ex. B7* | 15 | 0.8 | 95 | 16° | 80.0 | 4.0 | 15 | 98.0 |
| Ex. B8* | 15 | 0.8 | 95 | 16° | 80.0 | 4.0 | 100 | 97.2 |
| Ex. B9* | 15 | 0.9 | 95 | 16° | 80.0 | 15.0 | 50 | 96.8 |
| Ex. B10* | 15 | 0.6 | 95 | 16° | 80.0 | 0.5 | 50 | 97.2 |
| Ex. B11* | 15 | 0.8 | 95 | 8° | 90.0 | 4.0 | 50 | 98.0 |
| Ex. B12* | 15 | 0.8 | 95 | 30° | 80.0 | 4.0 | 50 | 96.2 |
| Ex. B13* | 15 | 0.8 | 95 | 25° | 60.0 | 4.0 | 50 | 96.0 |
| Ex. B14* | 15 | 0.8 | 95 | 12° | 95.0 | 4.0 | 50 | 98.4 |
| Ex. B15* | 2 | 0.5 | 30 | 16° | 80.0 | 2.0 | 50 | 20.0 |
| Ex. B16* | 1 | 0.3 | 95 | 68° | 10.0 | 1.8 | 50 | 45.0 |

*reference example
*comparative example

What is claimed is:

1. A lithium complex oxide sintered plate for use in a positive electrode of a lithium secondary battery, wherein the lithium complex oxide sintered plate includes a first major plate face and a second major plate face that is opposite from and parallel to the first major plate face, and a structure in which a plurality of primary grains having a layered rock-salt structure are bonded, wherein the lithium complex oxide has a composition represented by the formula: $Li_x(Co_{1-y}M_y)O_{2\pm\delta}$, wherein $1.0 \leq x \leq 1.1$, $0.005 \leq y \leq 0.1$, $0 \leq \delta < 1$, and M is at least one selected from the group consisting of Mg, Ni, Al, and Mn, and the primary grains have a mean tilt angle of more than 0° to 30° or less, the mean tilt angle being a mean value of the angles defined by the (003) planes of the primary grains and one of the first or second major plate faces of the lithium complex oxide sintered plate, and wherein a ratio of individual primary grains having tilt angles of 0° to 30° among all the primary grains is 60% or more.

2. The lithium complex oxide sintered plate according to claim 1, having a porosity of 3 to 40%.

3. The lithium complex oxide sintered plate according to claim 1, having:
a mean pore diameter of 15 μm or less,
an open pore rate of 70% or more, and
a thickness of 15 to 200 μm,
wherein the primary grains have a primary grain diameter of 20 μm or less, the primary grain diameter being a mean diameter of the primary grains.

4. The lithium complex oxide sintered plate according to claim 1, wherein a ratio of individual primary grains having tilt angles of 0° to 30° among all the primary grains is 80% or more.

5. The lithium complex oxide sintered plate according to claim 1, wherein a ratio of individual primary grains having tilt angles of 0° to 30° among all the primary grains is 90% or more.

6. The lithium complex oxide sintered plate according to claim 1, having a thickness of 30 to 150 μm.

7. The lithium complex oxide sintered plate according to claim 1, having a thickness of 50 to 100 μm.

8. A lithium secondary battery comprising the lithium complex oxide sintered plate as a positive electrode according to claim 1.

* * * * *